United States Patent [19]

Shiga

[11] Patent Number: 4,583,837

[45] Date of Patent: Apr. 22, 1986

[54] COPY BOARD STAND FOR A REPRODUCING CAMERA

[75] Inventor: Koji Shiga, Kanagawa, Japan

[73] Assignee: Fuji Photo Film Co., Ltd., Kanagawa, Japan

[21] Appl. No.: 573,757

[22] Filed: Jan. 25, 1984

[30] Foreign Application Priority Data

Jan. 25, 1983 [JP] Japan ................. 58-8754[U]
Jan. 25, 1983 [JP] Japan ................. 58-8755[U]
Jan. 25, 1983 [JP] Japan ................. 58-8760[U]

[51] Int. Cl.⁴ .............................. G03B 27/62
[52] U.S. Cl. ......................... 355/75; 355/74
[58] Field of Search .................. 355/74, 75, 64

[56] References Cited

U.S. PATENT DOCUMENTS

| 3,732,010 | 5/1973 | Harter | 355/74 X |
| 4,208,124 | 6/1980 | Fox | 355/75 X |
| 4,252,436 | 2/1981 | Kogane | 355/75 |
| 4,320,965 | 3/1982 | Kimura et al. | 355/74 |
| 4,417,810 | 11/1983 | Ueda et al. | 355/74 |

Primary Examiner—Richard A. Wintercorn
Attorney, Agent, or Firm—Sughrue, Mion, Zinn Macpeak & Seas

[57] ABSTRACT

A copy board for a reproducing camera in which the illumination of an original to be copied is maintained constant, independent of the size of the original. The copy board includes first and second sets of masking members with the two members of each set being reciprocatable in opposite directions from one another and with the directions of reciprocation of the two sets being perpendicular to one another. The sides of the mask members disposed towards a light source are made reflective, while the opposite sides are made light absorbing. An original guide member is provided on the surface of the copy board, with the original guide member being movable in synchronization with the movement of the mask members.

9 Claims, 5 Drawing Figures

COPY BOARD STAND FOR A REPRODUCING CAMERA

BACKGROUND OF THE INVENTION

The present invention relates an copy board for a reproducing camera (hereinafter referred to merely as an "copy board", when applicable). More particularly, the invention relates to an copy board including mask members, which are moved in conformance with a photographing reduction setting, and an original guide member, which is moved in synchronization with the movement of the mask members.

It is often difficult to correctly position an original on the surface of an copy board. Particularly, when a light-transmitting original such as an X-ray is to be copied using a back lighting source, it is necessary to use a mask to block light around the borders of the original. Therefore, in this case, both the original and the mask must be carefully set in place. Heretofore, in such a case, first the original was set in place and then mask members made of a metal or an opaque plastic were manually placed around the original. This conventional method is of course slow.

Moreover, when a reproducing camera is used, sometimes it is desired for a copied picture to have a dimensional reference. Heretofore, a scale was manually placed alongside the original. This method is also of low efficiency.

Furthermore, the conventional copy board suffers from a problem in that the mask members were movably provided below the diffusion board of the copy board, and the mask members were made of a metal plate having both sides painted black, or they were made of a black plastic plate. Therefore, when the masked area is changed, the amount of absorption of light is changed, and the brightness of parts which are not masked (light-transmitting parts) is changed.

This will become more apparent from the graph of FIG. 4. That is, FIG. 4 indicates the fact that, as the original size is decreased from A to C, the overall brightness is decreased. If this phenomenon occurs in a reproducing camera, then the exposure will be incorrect, and accordingly the resultant image will be poor in quality. If the phenomenon occurs with an observing device such as a light table, the brightness of the light source must be adjusted to take into account the size of a original under observation. This is troublesome for the operator.

SUMMARY OF THE INVENTION

In view of the foregoing, the invention provides an copy board for a reproducuing camera in which the image of an original on the copy board is formed on a copying photosensitive material by means of an optical system, and which, according to the invention, includes mask members movable to conform to an original size, and an original guide member provided on the surface of the copy board, with the original guide member being moved in synchronization with the movement of the mask members.

The invention further provides a copy board for a reproducing camera in which the image of an original on the copy board is formed on a copying photosensitive material by means of an optical system, and which, according to the invention, includes mask members which are automatically positioned upon setting an original size, the mask members being utilized to set an original setting guide member or a dimension reference scale at a predetermined position.

Still further, the invention provides either one of the above-described copy board in which, when the mask area of the mask mechanism is changed, the brightness of the light-transmitting part is maintained unchanged.

DESCRIPTION OF THE PREFERRED EMBODIMENTS

A preferred embodiment of the invention will now be described in detail with reference to the accompanying drawings.

Figure 1:
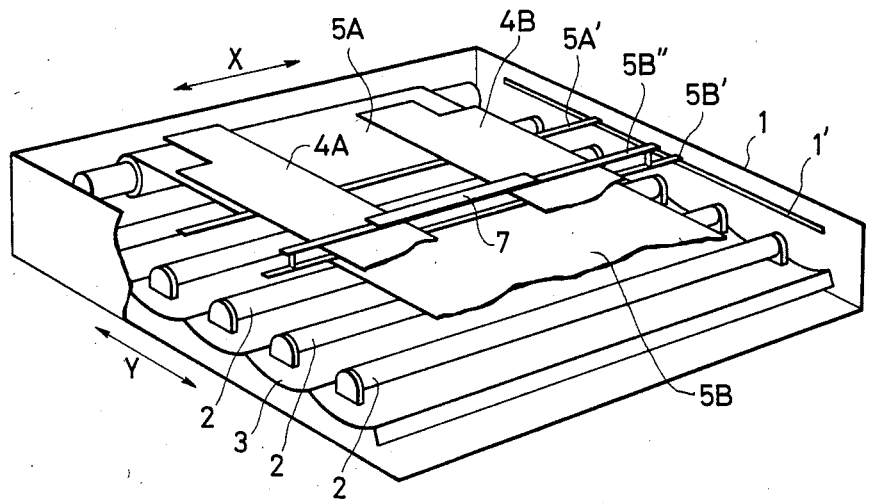
FIG. 1 is a perspective view, with parts cut away, showing a mask mechanism in an copy board for a reproducing camera constructed in accordance with the invention.

FIG. 1 is a perspective view, with parts cut away, showing the basic structure of a preferred embodiment of an copy board. In FIG. 1, reference numeral 1 designates a housing; 2, fluorescent lamps used as back lighting sources; 3, a reflecting board; 4A and 4B, first mask members forming an X-direction mask; and 5A and 5B, second mask members forming a Y-direction mask. An original placing surface, namely, a diffusion board (not shown) forms the upper surface of the housing 1. The reflecting board 3 has a configuration which allows the fluorescent lamps 2 to illuminate the original uniformly.

In the described embodiment, each of the first mask members 4A and 4B is a metal plate having a front surface (on the side of the diffusion board) colored black and a rear surface (on the side of the light source) colored white. The second mask members 5A and 5B, which are made of black plastic material such as PVC sheets having aluminum foil on their rear surfaces, are locked to guide bars 5A' and 5B', respectively. A scale plate 7 is secured to the guide bar 5B', either detachably or integrally, in such a manner that it crosses the first mask members 4A and 4B.

Figure 2:
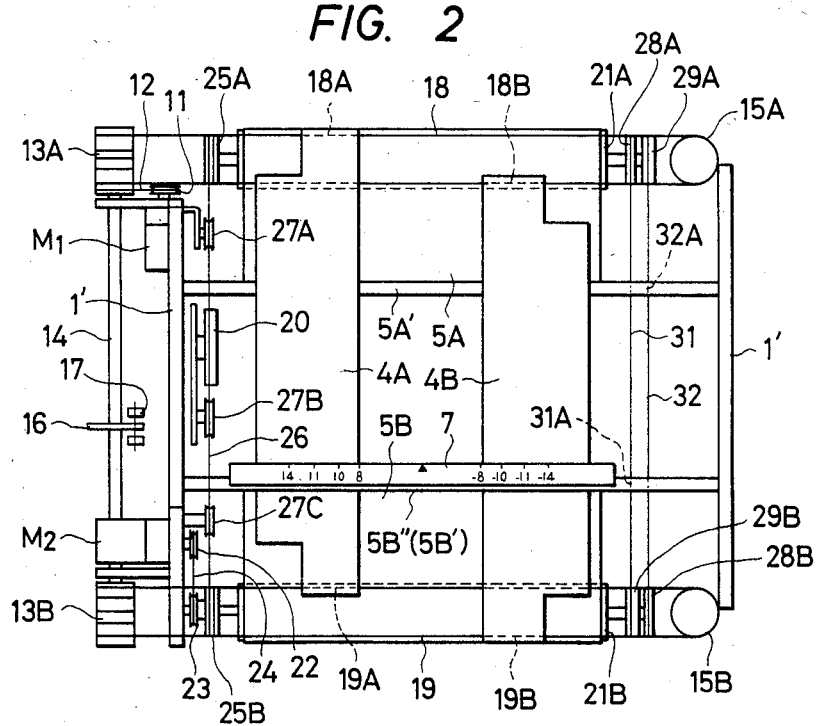
FIG. 2 is a plan view of the mask mechanism of FIG. 1.

FIG. 2 is a plan view of the copy board showing the arrangements of the first and second mask members in detail.

A wire 18 is laid around a pulley 15A and a drum 13A which is engaged with a motor $M_1$ through a pulley 11 and a belt 12. Similarly, a wire 19 is laid around a pulley 15B and another drum 13B mounted on the shaft 14 of the drum 13A. The first mask members 4A and 4B are connected to the wires 18 and 19. More specifically, the first mask member 4A is connected to the wire 18 at the point 18A and to the wire 19 at the point 19A, and the first mask member 4B is connected to the wire 18 at the point 18B and to the wire 19 at the point 19B. Accordingly, as the motor $M_1$ rotates in the forward direction, the drums 13A and 13B are rotated in the forward direction so that the mask members 4A and 4B are moved towards each other. On the other hand, when the motor $M_1$ rotates in the reverse direction, the drums 13A and 13B are rotated in the reverse direction so that the mask members 4A and 4B are moved away from each other.

A slotted disc 16 is mounted on the shaft 14 to control the positions of the mask members 4A and 4B. The disc 16 makes about 4/5 revolution while the mask members 4A and 4B move between positions corresponding to the minimum and maximum original sizes. A plurality of detectors 17A and 17B, composed of light-emitting elements and light-detecting elements, are provided for the disc 16 to detect the slots of the disc 16, thereby to detect masking settings corresponding to various original sizes.

The second mask members 5A and 5B are flexible plastic sheets, first ends of which are connected to the guide bars 5A' and 5B' as described above. The other ends of the plastic sheets are wound on respective winding shafts 21A and 21B. The winding shafts 21A and 21B are coupled to a motor $M_2$ through a first drive transmission system including pulleys 22 and 23 and a belt 24 and a second drive transmission system including drums 25A and 25B, a wire 26 and intermediate pulleys 27A, 27B and 27C. The pulleys 27A, 27B and 27C are used for laying the wire 26 over the drums 25A and 25B in cross-belt form and for adjusting the tension of the wire 26. The second drive transmission system including the wire 26 further includes a drum 20. The wire 26 is wound on the drum 20 at least two turns. A slotted disc (not shown) is mounted on the shaft of the drum 20 for controlling the positions of the mask members 5A and 5B, and a plurality of detectors are provided for the slotted disc for detecting the slots in the disc. The disc and its detectors have the same construction as those used for controlling the positions of the mask members 4A and 4B.

The winding shafts 21A and 21B are coupled to drums 29A and 29B and engaged with respective freely rotatable pulleys 28A and 28B. An endless wire 32 is laid around the drum 29A coupled to the winding shaft 21A and the pulley 28B on the winding shaft 21B. The guide bar 5A' of the mask member 5A is connected to the wire 32 at the point 32A. Similarly, an endless wire 31 is laid around the drum 29B coupled to the winding shaft 21B and the pulley 28A on the winding shaft 21A. The guide bar 5B' of the mask member 5B is connected to the wire 31 at the point 31A. In FIGS. 1 and 2, reference numeral 1' designates guide rails for guiding the guide bars 5A' and 5B' of the mask members 5A and 5B.

Figure 3:
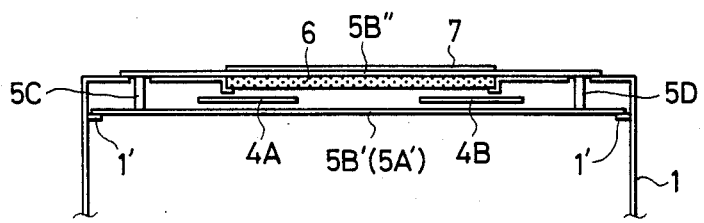
FIG. 3 is a sectional view of the mask mechanism of FIG. 1.
Figure 4:
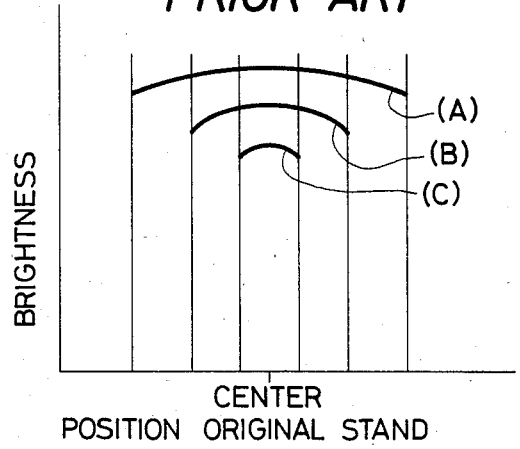
FIG. 4 is a graphical representation used for a description of difficulties accompanying a conventional mask mechanism.

The guide bar 5B' of the mask member 5B is of a dual structure (not shown in FIG. 1 or 2). That is, the guide bar 5B' has a guide member 5B'' above it. More specifically, the guide member 5B'' is located over the diffusion board which is provided above the first mask members 4A and 4B as shown in FIG. 3. In FIG. 3, reference numeral 6 designate the aforementioned diffusion board; 5B'', the above-described guide member, used for properly positioning originals, which is positioned above the diffusion board 6; and 5C and 5D, coupling members. These coupling members 5C and 5D serve as stops for preventing excessive opening of the first mask members 4A and 4B.

The operation of the copy board thus constructed will be described. The following description relates to the case of X-direction mask formation (positioning or sizing). However, it should be noted that the same technical concept is equally applicable to Y-direction mask formation.

When an original size setting button provided on the side wall of the copy board is depressed to set an original size, the corresponding one of the above-described detectors 17A, 17B, etc. is selected. Then, the motor $M_1$ is rotated so that the mask members 4A and 4B are moved away from each other, that is, so that the mask size is enlarged. When the slot in the disc 16 is detected by the selected detector, a mask of a size corresponding to the set original size has been formed, and the mask members 4A and 4B are accordingly stopped.

If, in the above-described operation, the mask members 4A and 4B reach the positions for the maximum size without detecting any slot of the disc 16, the motor $M_1$ is turned in the opposite direction immediately so that the mask members 4A and 4B are moved towards each other. This process is effected for detecting the designated slot and setting the mask size in the case where the selected original size is smaller than the previously set original size, as determined by the positions of the mask members 4A and 4B. Moving the mask members in a predetermined direction to position them as described above provides an effect that the positioning accuracy is improved.

While the X-direction mask formation is being carried out or after the X-direction mask formation has been accomplished, the Y-direction mask formation is also conducted. As described above, the Y-direction mask formation is controlled completely in the same manner as in the case of X-direction mask formation. The mask members 5A and 5B are moved together with the guide members 5A' and 5B' moving on the guide rails 1'. With the original size setting button depressed, simultaneously with the movement of the mask members, a reduction change mechanism (not shown) is operated so that the magnification of the copying optical system is set to a value suitable for the selected original size.

In the above-described embodiment, the original setting guide member 5B'' moving on the original placing surface in synchronization with the guide member 5B' is provided, which provides an effect that an original can be properly positioned quite easily.

Figure 5:
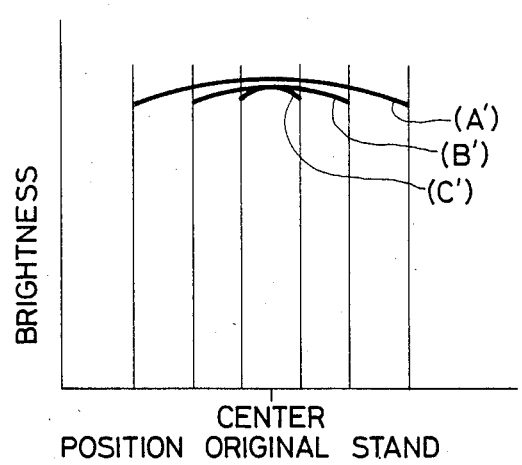
FIG. 5 is a graphical representation used for a description of the effects of the mask mechanism according to the invention.

FIG. 5 is a graph showing variations in brightness of the transmission part when the mask members are moved to various positions corresponding to various original sizes. As is apparent from a comparison of FIG. 5 with FIG. 1, in the copy board of the invention, when the original size is changed, the brightness is maintained substantially constant.

In order to increase the reflectivity of the surface of the mask member facing the light source, white paint or a covering of aluminum foil can be used. Also vacuum-deposited aluminum can be employed. Alternatively, such approaches may be employed suitably in combination.

While a specific mask member position controlling method has been described, it should be noted that the invention is not limited thereto or thereby. It goes without saying that instead of selectively inputting an original size to set the mask size, etc., other data such as a desired photographing reduction may be supplied. Furthermore, the copy board may be so designed that the original setting guide member operates in association with the X-direction mask members.

In addition, if the first and second mask members are made movable independently of the automatic setting mechanism and the reduction change mechanism and provision is made for automatically switching between the manual and automatic moving modes, then the copy board can handle special size originals.

I claim:

1. A copy board for a reproducing camera in which the image of an original on said copy board is formed on a copying photosensitive material by means of an optical system, comprising:

mask members movable to conform to an original size, wherein said mask members comprise first and second mask members reciprocably mounted to be reciprocable toward and away from one another in a first direction, and third and fourth mask members reciprocably mounted to be reciprocable toward and away from each other in a second direction perpendicular to said first direction;

original guide means provided on a surface of said copy board for guiding said original; and means for moving said original guide means in synchronization with movement of said mask members.

2. A copy board as recited in claim 1, wherein said original guide means are attached to said first and second mask members and wherein said moving means comprises means for moving said first and second mask members in synchronization with movement of said third and fourth mask members.

3. The copy board for a reproducing camera of claim 1, further comprising a light source for providing substantially uniform illumination in a plane parallel to said first and second directions.

4. The copy board for a reproducing camera of claim 3, wherein surfaces of each of said mask members facing said light source have a high reflectivity and opposite surfaces of each of said mask members have a low reflectivity.

5. The copy board for a reproducing camera of claim 1, wherein said first and second mask members are flexible members, and wherein said moving means comprises a first motor; first and second shafts, at least portions of said first and second mask members being wound around respective ones of said mask members; means for coupling said first motor to said first and second shafts to rotate said first and second shafts in opposed directions; means for moving said original guide means in response to rotation of said first motor; a second motor; and means for coupling said second motor to said third and fourth mask members to move said third and fourth mask members in opposed directions.

6. The copy board for a reproducing camera of claim 5, wherein said means for coupling said first motor to said first and second shafts comprises a first pulley coupled to an output shaft of said first motor; a second pulley coupled to said first shaft; a belt laid around said first and second pulleys; a third pulley coupled to said first shaft; a fourth pulley coupled to said second shaft; a belt laid between said third and fourth pulleys; a first drum coupled to said first shaft; a second drum coupled to said second shaft; a fifth pulley coupled to said first shaft; a sixth pulley coupled to said second shaft; a first endless wire laid around said first drum and said fifth pulley; a second endless wire laid around said second drum and said sixth pulley; and first and second guide bars coupled to inward edges of said first and second mask members, respectively, said first guide bar being coupled to said first endless wire and said second guide bar being coupled to said second endless wire, said original guide means being coupled to said first guide bar.

7. The copy board for a reproducing camera of claim 6, wherein said means for coupling said second motor to said third and fourth mask members comprises a third shaft; third and fourth drums mounted on respective ends of said third shaft; a seventh pulley mounted on an output shaft of said second motor; a third belt laid around said seventh pulley and said third drum; eighth and ninth pulleys rotatably mounted at a side of said copy board opposite said third shaft; a third endless wire laid around said first drum and said eighth pulley; and a fourth endless wire laid around said fourth drum and said ninth pulley, said third and fourth mask members being coupled to said third and fourth endless wires to be moved in opposite directions in response to rotation of said second motor.

8. The copy board for a reproducing camera of claim 1, further comprising a scale member detachably connected to said original guide member.

9. The copy board for a reproducing camera of claim 1, further comprising a scale member integrally connected to said original guide member.

* * * * *